J. W. REEDER.

Improvement in Buggy-Reach.

No. 132,320.    Patented Oct. 15, 1872.

Witnesses:
E. Wolff
E. Sedgwick

Inventor:
J. W. Reeder
per Munn & Co
Attorneys.

UNITED STATES PATENT OFFICE.

JOHN W. REEDER, OF WEST MANCHESTER, OHIO.

IMPROVEMENT IN BUGGY-REACHES.

Specification forming part of Letters Patent No. 132,320, dated October 15, 1872.

*To all whom it may concern:*

Figure 1:
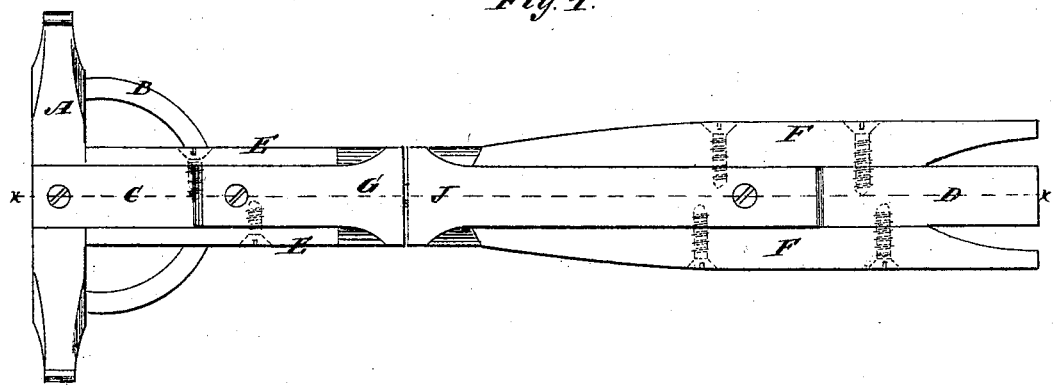
Figure 2:
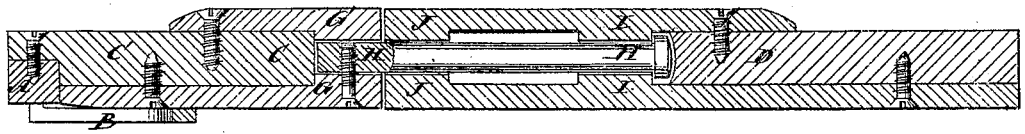

Be it known, that I, JOHN W. REEDER, of West Manchester, in the county of Preble and State of Ohio, have invented a new and useful Improvement in Buggy-Reach, of which the following is a specification:

Figure 1 is a top view of my improved reach. Fig. 2 is a detail longitudinal section of the same taken through the line $x\ x$, Fig. 1.

Similar letters of reference indicate corresponding parts.

My invention has for its object to furnish an improved reach for buggies and other vehicles, which shall be so constructed that one of the wheels may rise in passing over obstructions without twisting the reach, splitting the head-block, breaking the braces, or straining or otherwise injuring the reach or its connections, and which, at the same time, shall be simple in construction, convenient in use, and effective in operation; and it consists in the construction and combination of various parts of the reach, as hereinafter more fully described.

A is the head-block; B is the fifth wheel; C is the front, and D is the rear part of the reach, the middle part being cut away; E are the forward braces that strengthen the connection between the forward end of the reach and the head-block; F are the rear braces that strengthen the connection between the rear end of the reach and the rear axle. To the rear end of the forward part C of the reach is attached an iron block, G, which is made with straps or arms to extend along the upper and lower sides of the said part and receive the bolts by which the said block is secured to the said part C of the reach. In the block G is formed a hole to receive the forward end of the coupling and pivoting bolt H, which may be secured in place by a screw-bolt, nut, or head, as may be desired. The block G should be made so thick as to give a firm support to the bolt H. To the forward end of the rear part D of the reach is attached an iron block, I, which is made with straps or arms which project to the rearward to receive the screws or bolts by which the said block I is secured in place. The said straps or arms project forward, and between their forward ends are formed a second block, J, as shown in Fig. 2. The blocks I J have a hole formed through their centers to receive the rear part of the bolt or pin H, which is secured in place by a head or nut upon its rear end of the rear side of the block I. I prefer to use a nut, as it enables the wear to be conveniently taken up.

By this construction either end of the vehicle can incline laterally, as either wheel passes over an obstruction so as to prevent the reach or any of its attachments or connections from being strained or broken.

Having thus described my invention, I claim as new, and desire to secure by Letters Patent—

The combination of reaches C D, blocks G I J, and bolt H, constructed as set forth, with the head-block A and fifth-wheel B, as and for the purpose described.

JOHN W. REEDER.

Witnesses:
J. H. ARRASMITH.
WM. BROWN.